US011055916B2

(12) United States Patent
Chui et al.

(10) Patent No.: US 11,055,916 B2
(45) Date of Patent: *Jul. 6, 2021

(54) VIRTUALIZING CONTENT

(71) Applicant: Outward, Inc., San Jose, CA (US)

(72) Inventors: Clarence Chui, Los Altos Hills, CA (US); Marc Mignard, San Jose, CA (US)

(73) Assignee: Outward, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/231,035

(22) Filed: Dec. 21, 2018

(65) Prior Publication Data

US 2019/0221042 A1 Jul. 18, 2019

Related U.S. Application Data (63) Continuation of application No. 14/741,295, filed on Jun. 16, 2015, now Pat. No. 10,210,658, which is a (Continued)

(51) Int. Cl.
*G06T 19/00* (2011.01)
*G06T 11/00* (2006.01)
(Continued)

(52) U.S. Cl.
CPC ........ *G06T 19/006* (2013.01); *G06K 9/00201* (2013.01); *G06T 11/00* (2013.01); *H04N 5/23229* (2013.01); *H04N 7/0125* (2013.01); *H04N 21/234318* (2013.01); *H04N 21/4223* (2013.01); *H04N 21/8126* (2013.01)

(58) Field of Classification Search
CPC ... G06T 11/00; G06T 19/006; G06K 9/00201; H04N 7/0125; H04N 5/23229; H04N 21/4223; H04N 21/8126; H04N 21/234318
USPC ....... 345/420, 632, 582, 474, 619, 629, 633, 345/690; 382/167, 159; 726/26; 348/441, 169; 709/236; 705/26.1, 14.73
See application file for complete search history.

(56) References Cited

U.S. PATENT DOCUMENTS 5,941,944 A 8/1999 Messerly
6,377,257 B1 4/2002 Borrel
(Continued)

FOREIGN PATENT DOCUMENTS

EP 1113669 7/2001
WO 2012048456 A1 4/2012

OTHER PUBLICATIONS

Park et al., 'Mixed Reality Based Interactive 3D Story Composition Tool', TIDSE 2006, 181-186.

*Primary Examiner* — John W Miller
*Assistant Examiner* — Sean N. Haiem
(74) *Attorney, Agent, or Firm* — Van Pelt, Yi & James LLP (57) ABSTRACT

Techniques for virtualizing content are disclosed. One or more objects comprising source video content are determined. The one or more objects comprising the source video content are virtualized by mapping each to and representing each with a corresponding database object. Data comprising the corresponding database objects is provided for rendering the source video content instead of any original pixel information of the source video content so that a virtualized version of the source video content is rendered.

30 Claims, 7 Drawing Sheets

Related U.S. Application Data continuation of application No. 14/069,040, filed on Oct. 31, 2013, now Pat. No. 9,111,378.

(60) Provisional application No. 61/720,857, filed on Oct. 31, 2012.

(51) Int. Cl.
*H04N 21/2343* (2011.01)
*H04N 21/4223* (2011.01)
*H04N 21/81* (2011.01)
*H04N 7/01* (2006.01)
*G06K 9/00* (2006.01)
*H04N 5/232* (2006.01)

(56) References Cited

U.S. PATENT DOCUMENTS

| | | | |
|---|---|---|---|
| 6,654,414 B1* | 11/2003 | Narayanaswami | H04N 5/23238 348/E7.081 |
| 6,912,293 B1 | 6/2005 | Korobkin | |
| 7,007,295 B1 | 2/2006 | Rose | |
| 7,839,422 B2 | 11/2010 | Agarwala | |
| 8,165,342 B2* | 4/2012 | Reed | G06T 1/0028 382/100 |
| 8,429,699 B2 | 4/2013 | Rodriguez | |
| 8,817,021 B1* | 8/2014 | Hickman | G06F 16/56 345/420 |
| 9,111,378 B2* | 8/2015 | Chui | H04N 7/0125 |
| 2002/0154133 A1* | 10/2002 | Dery | G06T 13/00 345/582 |
| 2004/0098236 A1* | 5/2004 | Mayer | G06T 17/05 703/2 |
| 2005/0002571 A1* | 1/2005 | Hiraga | G06K 9/469 382/218 |
| 2005/0171964 A1 | 8/2005 | Kulas | |
| 2005/0267893 A1 | 12/2005 | Headd | |
| 2006/0217979 A1 | 9/2006 | Pahud | |
| 2007/0005795 A1 | 1/2007 | Gonzalez | |
| 2007/0192818 A1 | 8/2007 | Bourges-Sevenier | |
| 2007/0214476 A1 | 9/2007 | Zalewski | |
| 2008/0071559 A1 | 3/2008 | Arrasvuori | |
| 2008/0120534 A1 | 5/2008 | Moore | |
| 2009/0064257 A1 | 3/2009 | Oehm | |
| 2009/0089186 A1* | 4/2009 | Paolini | G06Q 10/0637 705/26.1 |
| 2009/0144137 A1* | 6/2009 | Moulton | G06Q 30/00 705/14.73 |
| 2009/0149233 A1 | 6/2009 | Strause | |
| 2009/0165140 A1* | 6/2009 | Robinson | G06F 21/10 726/26 |
| 2009/0167787 A1 | 7/2009 | Bathiche | |
| 2009/0189974 A1* | 7/2009 | Deering | G02B 27/017 348/46 |
| 2009/0254572 A1* | 10/2009 | Redlich | G06Q 10/06 |
| 2010/0095236 A1 | 4/2010 | Silberstein | |
| 2010/0149399 A1* | 6/2010 | Mukai | G01C 21/20 348/333.02 |
| 2010/0157063 A1* | 6/2010 | Basso | G11B 27/105 348/169 |
| 2010/0246605 A1 | 9/2010 | Taylor | |
| 2010/0285884 A1 | 11/2010 | Gauer, III | |
| 2010/0289835 A1* | 11/2010 | Holub | G01J 3/02 345/690 |
| 2010/0310164 A1* | 12/2010 | Reed | G06T 1/0021 382/167 |
| 2011/0025689 A1* | 2/2011 | Perez | A63F 13/213 345/420 |
| 2011/0050947 A1 | 3/2011 | Marman | |
| 2011/0064388 A1* | 3/2011 | Brown | G06T 13/20 386/285 |
| 2011/0110581 A1* | 5/2011 | Yang | G06K 9/469 382/154 |
| 2011/0141141 A1* | 6/2011 | Kankainen | G01C 21/3647 345/632 |
| 2011/0169924 A1* | 7/2011 | Haisty | H04N 9/3147 348/51 |
| 2011/0175923 A1 | 7/2011 | Mahajan | |
| 2011/0181606 A1* | 7/2011 | Sumner | G06T 13/00 345/474 |
| 2011/0182500 A1* | 7/2011 | Esposito | G06K 9/00442 382/159 |
| 2011/0279445 A1 | 11/2011 | Murphy | |
| 2011/0292054 A1 | 12/2011 | Boker | |
| 2012/0013644 A1 | 1/2012 | Ichieda | |
| 2012/0020581 A1* | 1/2012 | Zarom | H04N 19/90 382/233 |
| 2012/0021297 A1 | 1/2012 | Hauser | |
| 2012/0059953 A1* | 3/2012 | Klappert | H04N 9/75 709/236 |
| 2012/0069051 A1 | 3/2012 | Hagbi | |
| 2012/0086727 A1* | 4/2012 | Korah | G06F 3/03 345/633 |
| 2012/0140025 A1 | 6/2012 | Friedman | |
| 2012/0256954 A1 | 10/2012 | Soon-Shiong | |
| 2012/0300122 A1* | 11/2012 | Liu | H04N 7/0117 348/441 |
| 2012/0306876 A1* | 12/2012 | Shotton | G06T 17/10 345/424 |
| 2013/0170557 A1 | 7/2013 | Wang | |
| 2013/0321574 A1* | 12/2013 | Zhang | H04N 19/597 348/43 |
| 2013/0346566 A1 | 12/2013 | Kwon | |
| 2014/0069224 A1 | 3/2014 | Dimig | |
| 2014/0085314 A1 | 3/2014 | Steinke | |
| 2014/0085479 A1* | 3/2014 | Haas | G06Q 10/08 348/159 |
| 2014/0150013 A1 | 5/2014 | Fauqueur | |

\* cited by examiner

VIRTUALIZING CONTENT

CROSS REFERENCE TO OTHER APPLICATIONS

This application is a continuation of U.S. patent application Ser. No. 14/741,295, now U.S. Pat. No. 10,210,658 entitled VIRTUALIZING CONTENT filed Jun. 16, 2015 which is incorporated herein by reference for all purposes, which is a continuation of U.S. patent application Ser. No. 14/069,040, now U.S. Pat. No. 9,111,378, entitled VIRTUALIZING CONTENT filed Oct. 31, 2013 which is incorporated herein by reference for all purposes, which claims priority to U.S. Provisional Patent Application No. 61/720,857 entitled RENDERING DIGITAL CONTENT filed Oct. 31, 2012 which is incorporated herein by reference for all purposes.

BACKGROUND OF THE INVENTION

Display roadmaps are rapidly transitioning from formats such as Full HD (1920×1080 pixels) to 4K UHD (3840×2160) as a consumer standard. The industry is also anticipating changes to even larger formats such as 8K UHD (7680×4320) within the next decade. However, the standards being defined for the UHD formats of video (up to 120 frames per second) will challenge available broadcasting and streaming bandwidth, particularly for wireless devices. The standards also challenge the industry's ability to produce input hardware (i.e., camera/video technologies) that matches up to the native output capability of the display hardware for the general consumer. High quality content creation for these new formats is not possible for the common user, and all video content captured prior to the UHD standards will not be natively compatible with display hardware in the near future. That is, the most common online content can never be viewed as a high quality experience with upcoming display hardware. Furthermore, imagers will lag display quality for the foreseeable future. Regardless, for amateur users, environmental/lighting conditions are typically not ideal for capturing high quality content. Moreover, less than ideal timing, shooting problems, spontaneous events, etc., also often reduce the quality of captured content.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

Figure 1:
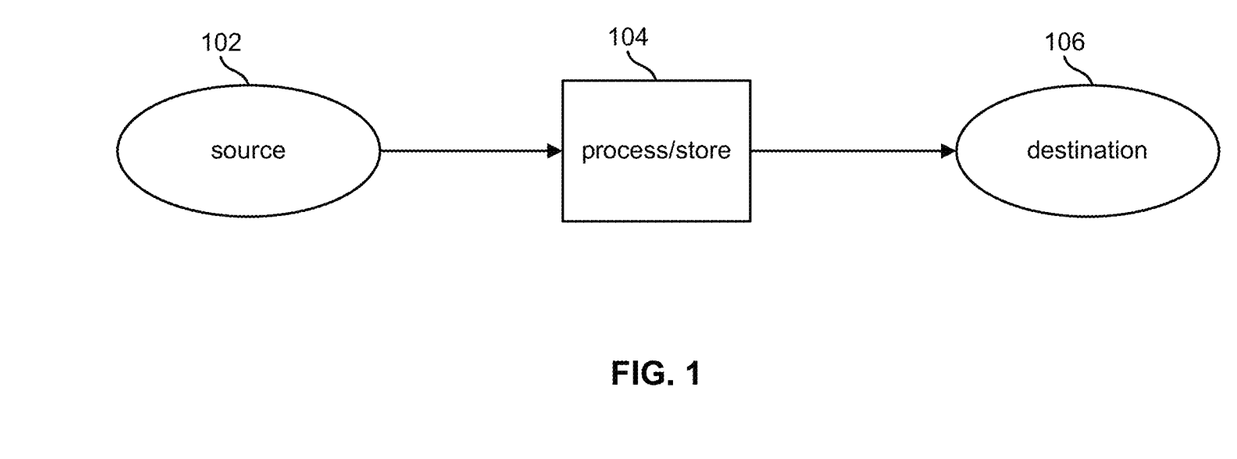
FIG. 1 is a high level block diagram illustrating an embodiment of typical stages associated with communicating content.

FIG. 1 is a high level block diagram illustrating an embodiment of typical stages associated with communicating content, such as image, video, or other multi-media content. At stage 102, source content is captured by a camera or other recording device. The format and quality of the source content is based on the capabilities and limitations of the recording device. At stage 104, the source content is processed and/or stored for immediate (i.e., real time) or later distribution. For example, the content processing of stage 104 may include content compression for easier storage and distribution. In some embodiments, as later described herein, the content processing of stage 104 comprises content conversion into a prescribed computational space. At stage 106, the content is delivered to and rendered at a destination device.

Typically, the quality of rendered content at a destination device is restricted by and does not exceed the quality of the source content despite the rendering capabilities of the destination device. However, the limitations of source content quality pose a growing challenge as rapid improvements occur in the hardware of destination devices. Poor quality source content is not suitable to serve the demands of HD (high definition) and emerging beyond-HD capable destination devices. Standard HD is quickly giving way to 2K HD, which will evolve into 4K HD. Moreover, hardware roadmaps already contemplate 8K HD, i.e., UHD (ultra high definition), which is approximately sixteen times the format size of standard HD.

Techniques for decoupling the format and quality of source content as well as the format and quality of the same content processed for storage and distribution from the rendering capabilities of a destination device are disclosed in detail herein. The disclosed multi-media technology platform facilitates flawless quality when rendering content from an arbitrary source on any of a plurality of types of destination devices by allowing performance up to the capability of the receiving system (including best-in-class display technologies) to be achieved. Thus, a high fidelity, cinematic quality viewing experience may be realized from any image or video source. The disclosed techniques not only allow users to create visually stunning image and video content anywhere, at any time, and on any device without having to be an expert in multi-media content creation tools but also allow users to re-imagine content in nearly unlimited ways. Although image or video source content is described in many of the given examples, the techniques disclosed herein may be extended to and employed with respect to any multi-media content.

Figure 2:
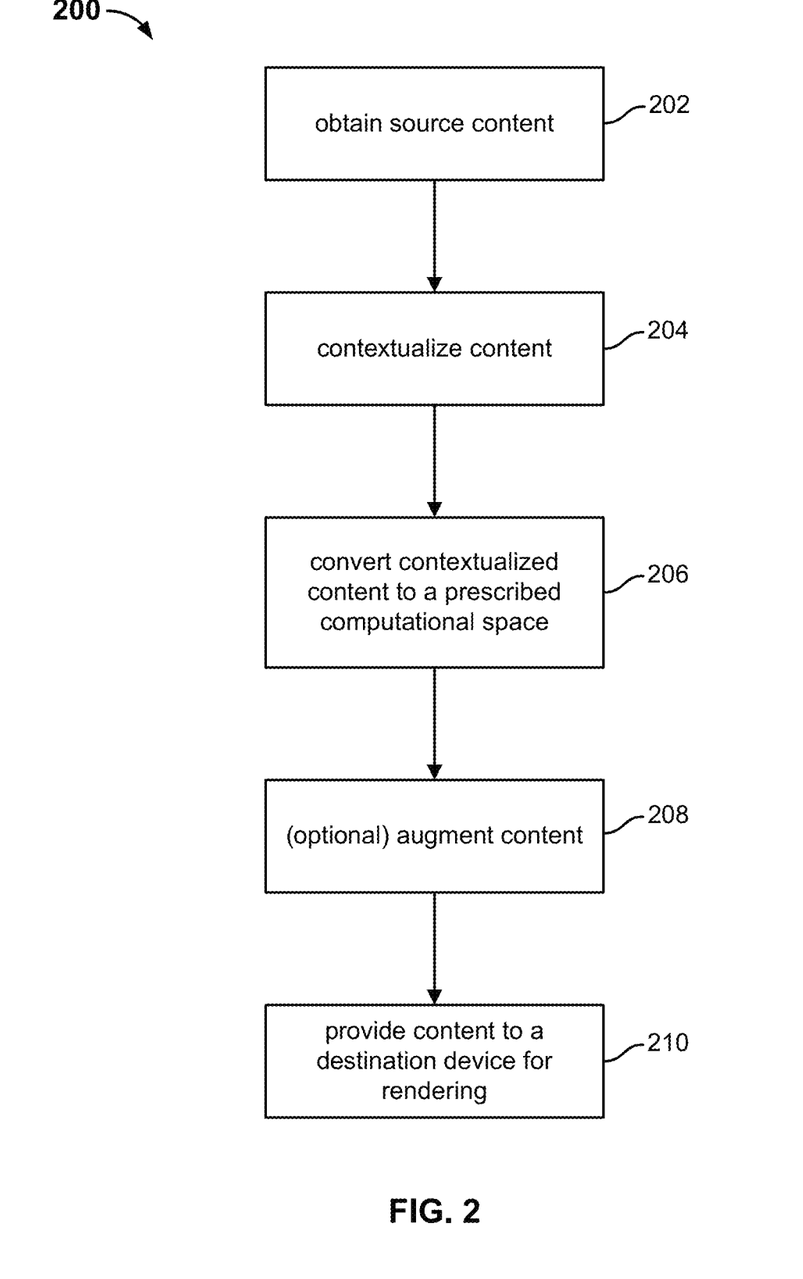
FIG. 2 is a flow chart illustrating an embodiment of a high level content distribution process based on context abstraction.

FIG. 2 is a flow chart illustrating an embodiment of a high level content distribution process based on context abstraction. At step 202, source content is obtained. For example, image or video content is obtained at step 202 from a device employed to capture the content and/or previously captured content is obtained from storage. At step 204, the content obtained at step 202 is contextualized. For example, one or more elements and/or characteristics of the context of the content are identified at step 204. At step 206, the contextualized content is converted to a prescribed, proprietary computational space. For example, elements and/or characteristics of the context of the content identified at step 204 are abstracted and transformed into object-based representations at step 206. Such object-based representations may be based on existing object assets residing in a database or cloud of assets. Alternatively, a new object representation may be determined and added to such a database or cloud. In some embodiments, the conversion of step 206 substantially, if not completely, virtualizes the source content such that little, if any, of the original source content (e.g., pixel and/or other data) is preserved when converted to the computational space based representation at step 206.

The content is optionally augmented at step 208. In most cases, the content is augmented to include at least one or more elements or features that were never a part of the original content obtained at step 202 but are included to provide an enhanced viewing experience at a destination device. At step 210, the content is provided to a destination device for rendering. Since the computational space is agnostic to the destination device, a perfect match for the capabilities of any destination device can be achieved using process 200. Thus, content may be rendered at a destination device based on the native format of the destination device as well as in the best quality supported by the destination device. For example, using process 200, source content captured via a relatively low resolution mobile phone camera may be rendered at a high resolution destination device in cinematic quality. In some embodiments, the content augmentation of step 208 may be performed client-side at a destination device.

As described, process 200 facilitates a high fidelity viewing experience regardless of the format or quality of the source content and offers unprecedented variability within the actually rendered content. The disclosed platform does not comprise merely compressing, upscaling, and/or replicating the appearance of source content. Rather, information gathered from contextual clues from the source content is employed to virtualize or create a re-imagined version of the content. In most cases, information is being added to, not removed from, the content. That is, more information than what is present in the original source content is provided for rendering at an output device. In many cases, the virtualized or re-imagined version of the source content comprises very little, if any, of the data comprising the original source content. Moreover, the content may be re-imagined differently for different output devices, for example, based on the rendering capabilities of the devices and/or other criteria associated with the devices. A key objective of the disclosed approach is not to create a lossless version of the source content, although that may coincidentally be an outcome, but rather to prioritize creation of content best suited for the capabilities of a destination device and/or customized for the destination device or a user thereof.

Figure 3:
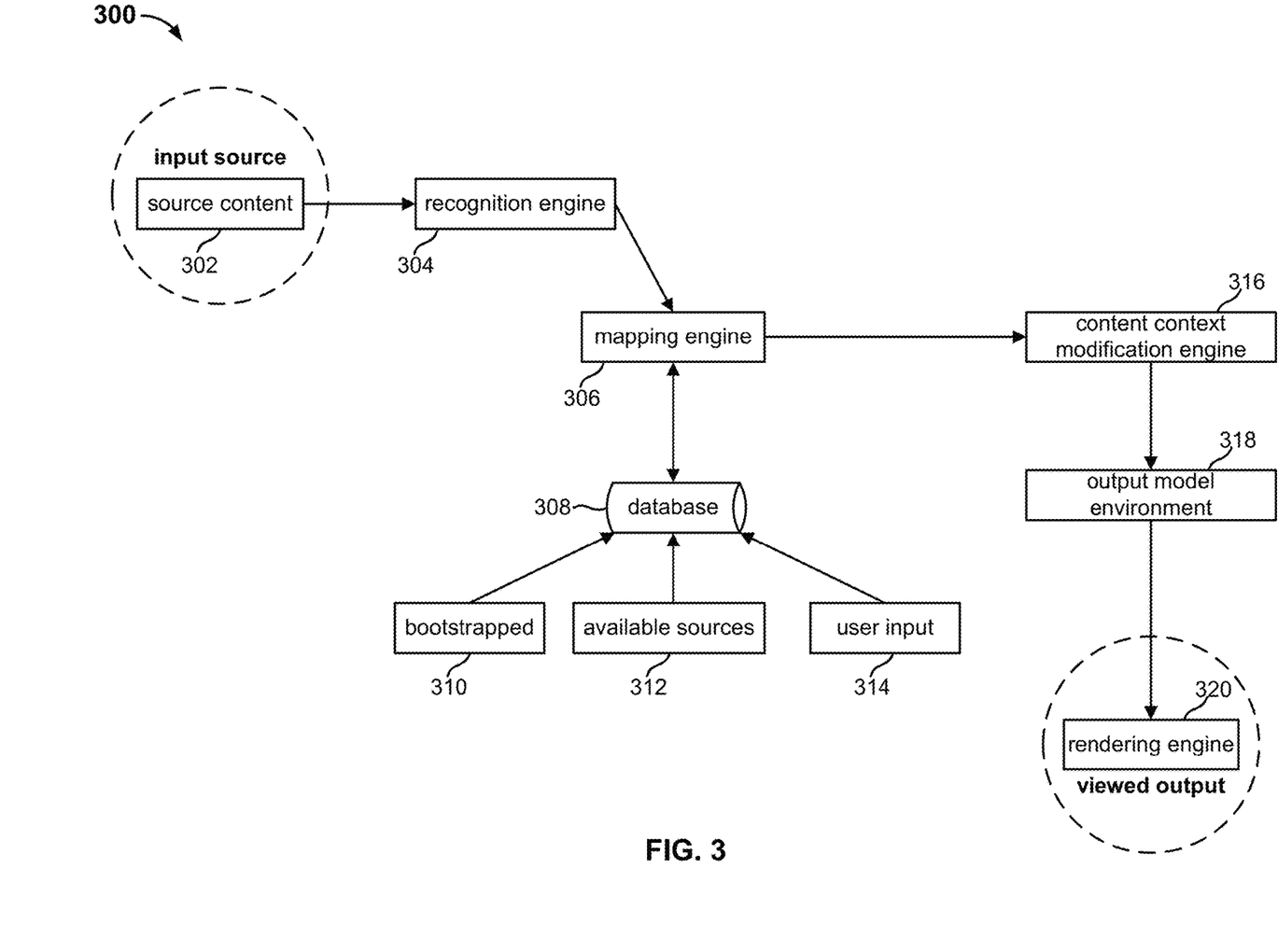
FIG. 3 is a block diagram illustrating an embodiment of the architecture of the disclosed content distribution platform based on context abstraction.

FIG. 3 is a block diagram illustrating an embodiment of the architecture of the disclosed content distribution platform based on context abstraction. This architecture provides novel techniques for creating, re-imagining, remastering, streaming, and rendering digital content. The various blocks of content distribution platform 300, for example, may be configured to perform corresponding steps of process 200 of FIG. 2. Block 302 comprises source content obtained from an input source. In various embodiments, the input source may comprise an imaging device (such as a camera) or may comprise existing multi-media content. Block 304 comprises a recognition engine configured to identify one or more elements and/or characteristics of input source content 302. That is, recognition engine 304 contextualizes source content 302. In various embodiments, recognition engine 304 may be configured to identify features, objects, background, illumination environment, etc., within input source content 302 using any combination of one or more standard and proprietary machine vision methods and/or assisted by human input.

Block 306 comprises a mapping engine configured to correlate and map the elements and/or characteristics identified by recognition engine 304 to the best matches available from an existing database 308 in which object specifications comprise prescribed computational space based representations. In some embodiments, mapping engine 306 is further configured to determine relative positions and orientations of identified objects within the model environment or scene representing the input source content. In many cases, objects in database 308 may need to be morphed or modified through available parameterization to match identified objects. In cases in which a suitably close match cannot be identified, an object may be substituted for by a best guess. Alternatively, an object and its associated properties may be created on an ad hoc basis from an analysis of source content 302 (e.g., by extracting geometry and texture) and submitted into database 308 for use during matching and mapping. In some cases, the correlation and/or mapping performed by mapping engine 306 is at least in part assisted by human input. In many cases, the environment or scene representing the input source content modeled by mapping engine 306 comprises little, if any, of the original data comprising input source content 302 since the modeled environment or scene comprises database object based representations of content. Thus, input source content 302 is effectively virtualized or re-imagined.

Block 308 comprises a database comprising an archive of available master objects and their associated properties. The depth and complexity of database 308 increases over time as it is populated as more and more data becomes available. An object entry in database 308 may comprise any appropriate and applicable parameters for specifying the object. For example, an object specification may include data comprising geometry (e.g., shape and size), surface texture, optical response to illumination, and/or any additional properties associated with the object (e.g., brand name, date and location of origin of manufacture, material properties, etc.). In some embodiments, object properties are parameterized to the extent possible to broaden the class of objects that can be represented by a given master object. Database 308 may be populated using any one or more appropriate techniques, some examples of which are depicted in FIG. 3. For instance, data comprising database 308 may be bootstrapped 310. That is, an object model may be created by directly extracting relevant data from input source content 302. Further, data comprising database 308 may be extracted from available sources 312. That is, object data may be extracted from other existing sources of image and/or video content. Moreover, data comprising database 308 may at least in part be entered by a user 314. That is, object data may be provided by user input comprising, for example, modeled/simulated data and/or data obtained via direct scanning and/or imaging of physical objects. Database 308 stores data associated with frequently appearing objects that can be used to generate content and adaptively improves over time as more objects and/or associated properties are learned.

Block 316 comprises a content context modification engine configured to modify and/or customize the environment or scene modeled by mapping engine 306 according to desired performance criteria. For example, the modeled environment may be altered by modifying objects, substituting objects with alternatives, and/or removing objects altogether. Moreover, the lighting of the modeled environment (e.g., lighting type and position, luminance, chromaticity, etc.) may be modified. In addition, perceived performance errors in the modeled environment or scene may be appropriately corrected as applicable. In the case of human subjects (i.e., parameterized master objects representing people in the source content), for instance, problems in gaze, appearance, etc., may be corrected. Furthermore, alternative camera positions/perspectives may be introduced into the modeled environment, for example, in addition to or instead of a default virtual camera appropriately located in a position to recreate a perspective defined by the source content.

Block 318 represents providing or outputting the modeled environment, for example, to a (requesting) client or destination device at which the modeled environment is desired to be rendered. Instead of original source content 302 being provided, parameters defining objects comprising the model representing source content 302 are delivered. Such a model environment specification may include, for example, object identifications, relative positions, and orientations; background and lighting environment specifications; camera position; etc. In some embodiments, a subset of the object database needed to create the modeled scene is provided. Alternatively, a copy of the subset of the object database needed to create the modeled scene may already be available at the client site or destination device to which the model environment is delivered and thus need not be provided. In some embodiments, block 318 includes storing a specification of the modeled environment or scene, e.g., for later distribution.

Block 320 comprises a rendering engine configured to render the environment or scene defined by the model at an output device (e.g., a flat panel display) with the characteristics of the objects referenced to the properties provided by the object database. Best in class techniques from the computer graphics industry may be applied by rendering engine 320 when rendering a scene. The subset of the object database needed to render the scene may be accessed by rendering engine 320 through a local copy or through direct access to database 308. In many cases, the scene is rendered by rendering engine 320 with a quality that is matched to the maximum quality performance achievable by the output device, i.e., is optimally matched to the display format, color performance, frame rate, etc., of the output device. Moreover, the scene rendered by rendering engine 320 may be personalized or customized based on a user and/or profiling of a user of the output device.

The described techniques for content distribution based on context abstraction offer numerous benefits. A high quality viewing experience may be delivered regardless of the quality of the source content and even when the source content is significantly degraded, e.g., due to compression artifacts or other noise. In many cases, the source content only has to be of sufficient quality for recognition engine 304 to identify features, objects, and background types. For example, in some cases, six bits of color per pixel in the source content are sufficient rather than thirty bits. Moreover, compression based block artifacts are in most cases acceptable; thus, very high compression ratios via traditional methods may be used to store the source content.

A scene captured by a common user using a device with consumer grade sensors having limited dynamic range is not only of relatively low resolution/quality but also is typically filmed without proper lighting or environmental conditions. However, using the disclosed techniques, viewed content can still be very high quality. Once an object is recognized, local tone correction can be applied, and highlights saturating an image can be corrected naturally when the scene is relit. Similarly, any other perceived imperfections can be corrected in or removed from the scene. For example, image stabilization as well as post processing to correct for performance errors may be introduced as applicable. With respect to a human subject, for instance, gaze may be corrected, closed eyes may be opened, stray hair may be removed, etc.

In various embodiments, content may be edited and/or re-imagined with any number of alternative visual qualities (e.g., lighting, surface characteristics, camera perspective, etc.) than originally intended from the source, and new and/or different content may be introduced. For example, a scene may be re-rendered with an advertiser's content such as brands, images, products, etc. Moreover, content may be personalized or customized based on an end user. Since object models may be specified in 3D in database 308, corresponding content may be naturally rendered in 3D if desired. Conversely, content may be rendered as a cartoon (e.g., in anime style) if desired.

For many applications, the disclosed content distribution techniques significantly reduce required communication bandwidth, for example, compared to traditional video codec approaches. Ultra-low bandwidth is especially feasible with fairly static scenes since object motion is the only required data that needs to be communicated. For example, video conferencing applications (such as telepresence, video chat, mobile video calls, etc.) are particularly well-suited for the disclosed platform. Source content from a low quality webcam, for instance, may be rendered in a UHD enabled telepresence conference room in cinematic quality. In addition to providing an ultra-low bandwidth solution for many applications, the disclosed content distribution techniques facilitate cinematic quality content creation at very low cost and overhead and without requiring expertise by an end user. Existing content may be easily re-imagined and/or remastered in limitless ways. For example, any archived image or video source may be rendered beautifully with cinematic quality on a UHD display. Additional applicable fields in which the disclosed techniques may be especially relevant include applications in the gaming, entertainment, and education industries as well as in any other industry in which efficient content distribution is paramount.

The described content contextualization platform is furthermore amenable to search applications, particularly contextual based image and video searches. A search may be conducted by searching for something according to one or more object definition criteria. Alternatively, a search may be conducted by creating content that best matches the search criteria. Content may be created, for instance, by modifying something that is quite close already (e.g., by re-lighting, re-orienting, and/or color correction; object removal and/or editing; etc.). Searches may be efficiently conducted against a network of one or more databases (such as database 308) comprising content libraries of object assets.

The manner in which database objects are specified and stored in the described architecture moreover facilitates future proofing multi-media content libraries with respect to evolving display and viewing technologies and standards. Further, content generation in 2D and 3D is easily supported since many database objects are inherently specified in 3D. Additionally, multi-scale object databases may be linked, facilitating support of an "infinite zoom" feature allowing advanced zooming, possibly down to even micro-scale and nano-scale levels.

In addition to the aforementioned advantages and applications, market trends in display technology are anticipated to favor the disclosed content distribution techniques based on context abstraction. To accommodate emerging display technologies, a new paradigm for content distribution will be imperative. The disclosed techniques provide one such architecture that is not only viable and scalable but also economic and resource efficient.

Figure 4:
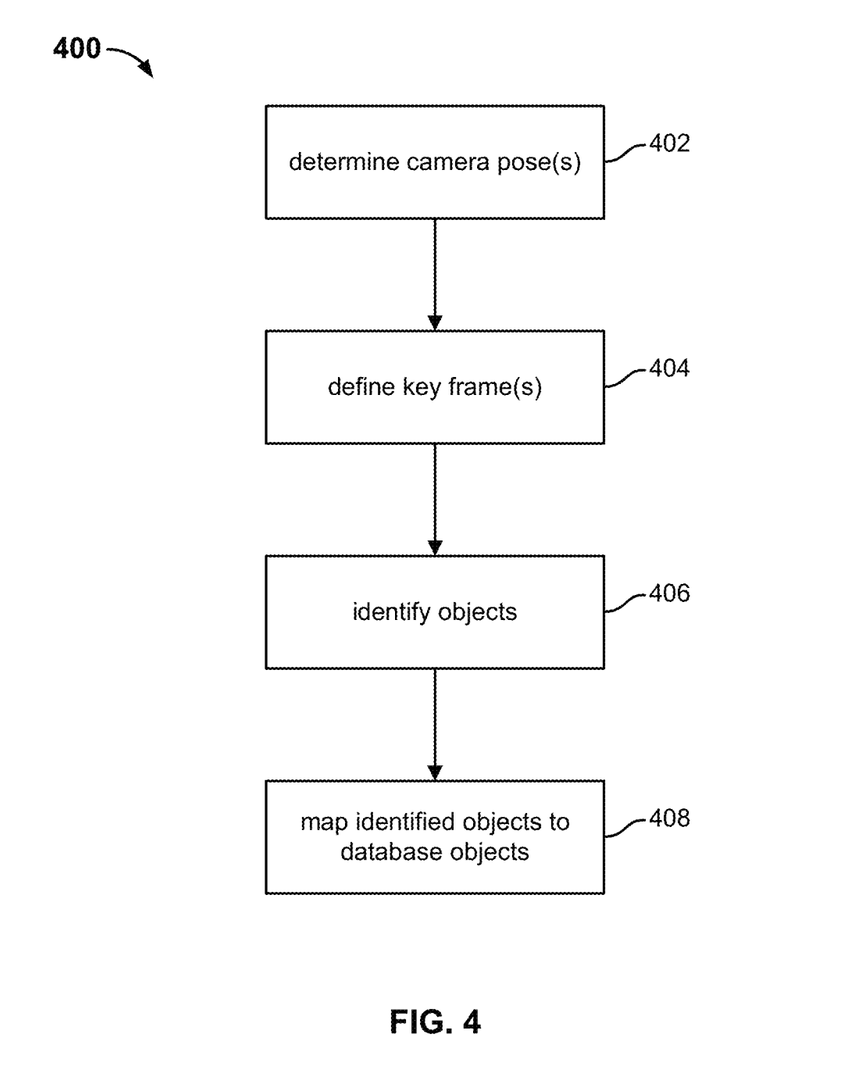
FIG. 4 is a flow chart illustrating an embodiment of a process for transforming source content into a virtualized, computational space based representation.

FIG. 4 is a flow chart illustrating an embodiment of a process for transforming source content into a virtualized, computational space based representation. For example, various steps of process 400 may be performed by recognition engine 304 and mapping engine 306 of FIG. 3. In some embodiments, process 400 is employed to transform original source content into a substantially virtualized representation in which little, if any, pixel and/or other data from the original source content is preserved in the computational space based representation of the source content, which is eventually provided to a destination device at which the source content is desired to be rendered. Although described with respect to video content, the steps of process 400 may be appropriately adjusted for image or other multi-media content.

Figure 5:
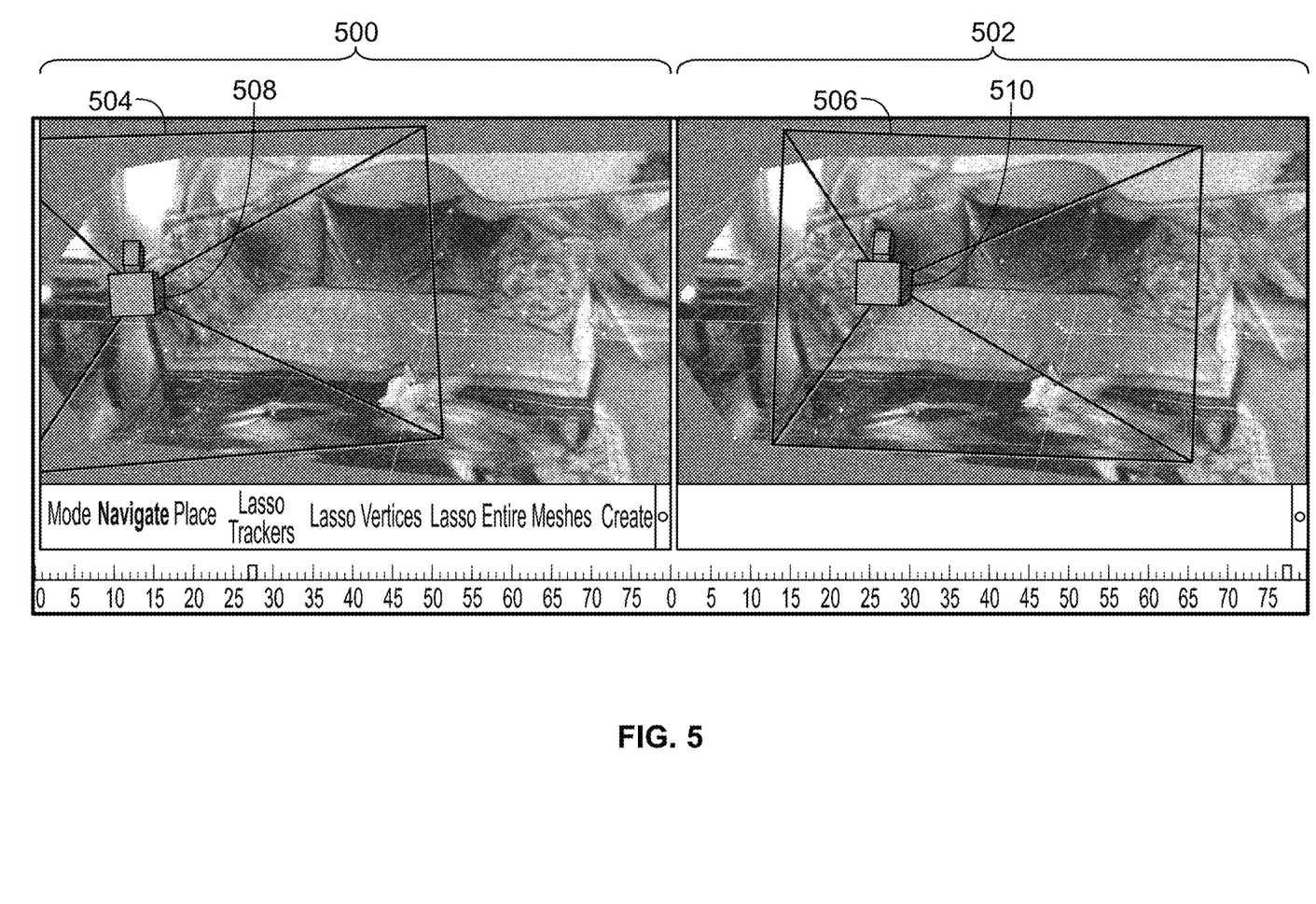
FIG. 5 illustrates an example of camera motion.

At step 402, camera pose relative to a scene comprising the source content is determined. In various embodiments, a scene may be substantially static and/or may include varying degrees of motion corresponding to changing camera positions (e.g., if the camera is panned or otherwise moved to capture different angles or perspectives of the scene). From the camera motion, standard computer vision based feature tracking algorithms may be employed to compute the pose (i.e., the position of the camera) relative to the scene. In some embodiments, a sequence of camera poses is determined at step 402 for a camera cut shot, wherein a cut comprises a sequence involving a single continuous motion of the camera. FIG. 5 illustrates an example of camera motion and specifically depicts two frames—frame 500 and frame 502—of a scene during the same sequence at different scrub times. Bounding box 504 and bounding box 506 indicate the field of view during each frame, and camera 508 and camera 510 represent the location of the camera position within each frame.

At step 404, key frames are defined. In the given context, a key frame comprises a frame in which critical features and/or objects of the scene are within the field of view of the camera. Such features and/or objects may leave or enter the field of view over time during a sequence. However, key frames may be selected to include most of the relevant features and/or objects needing tracking during a cut shot.

At step 406, objects are identified in each key frame. In some cases, object recognition is at least in part automated, e.g., for human faces, objects with regular geometries, etc. In some cases, object recognition is at least in part assisted by human intervention. In such cases, points in a frame or scene tracked by standard machine vision based algorithms are presented to a human operator for consideration. The human operator indicates or specifies a subset of tracked points that correspond to an object. Additional computer vision algorithms may be subsequently employed with respect to such a human operator identified subset of tracked points to segment a corresponding object from an image by determining the visual boundaries of the object with respect to other foreground and background content in the associated frame.

At step 408, each object identified at step 406 is mapped to a database object. In some cases, object mapping is at least in part automated. In some cases, object mapping is at least in part performed by a human operator. For example, a human operator may identify an object type or class (e.g., by traversing through a decision tree classifying different types of objects) and/or search against the database for an identified object class. In response to such a search, one or more similar objects may be presented to the operator for consideration. The operator may select one of the available database objects to represent a given object identified in the scene. Thus, an object from the source content is mostly, and in many cases completely, virtualized when matched and mapped to a corresponding database object, which is what is eventually used during rendering. In some embodiments, instead of seeking a best match, object mapping comprises purposely misinterpreting or mismatching an identified object when selecting a corresponding database object. For example, an identified cloud object in a source video may be mapped to a sun object in the database to reflect different weather.

In some embodiments, step 406 comprises identifying a partial object, and step 408 comprises mapping an identified partial object to a whole or complete database object. Objects and/or space comprising the source content may be expanded or augmented in the virtual environment or scene modeled from the source content as applicable. For example, a house corner identified at the edge of a frame in the source content may be mapped to a complete house object from the database. Thus, the virtual space comprising the modeled environment or scene may be much larger than the space encompassed by the original source content since in many cases it is desirable to render whole objects instead of partial objects, for example, to make the scene more visually appealing and amenable to interaction (e.g., via virtual user entry into the scene and change of camera position/perspective).

In some embodiments, to properly place an object in a model environment or scene representing the source content, at least a prescribed number of non-coplanar points are needed to specify the object. For example, an automated process and/or human operator may specify or select at least four non-coplanar tracked points when identifying an object at step 406. The points defining an identified object in a scene determined at step 406 are mapped to corresponding points on a selected database object to which the identified object is mapped at step 408. The relative match between the selected points in the source content and the selected points on the corresponding database object facilitates automatic rescaling and alignment of the 3D database object with the 2D view of the object in the source content. The match of orientation and position in the 2D view and the 3D object is in many cases approximate and may visually be confirmed for accuracy with the use of a semi-transparent overlay of the source image onto the camera view of the estimated 3D environment. Although placement may be completely automated, in some cases, adjustments in the placement may be made by a human operator if necessary and depending on the accuracy of the automated placement. In some cases, an object may be auto-adjusted to snap its bottom most surface to a surface it should be resting on (e.g., a table, shelf, floor, etc.) if it is not floating in the air.

Alignment performed in the aforementioned manner is helpful for confirming camera settings and camera pose for cases in which the movement of a camera in a cut shot is insufficient to estimate those parameters. Without movement, the combination of four (or some other prescribed number of) non-coplanar points on a reference object in the database and their correspondence to an object in the scene is sufficient to provide a reasonable estimate of the camera pose and settings.

Figure 6:
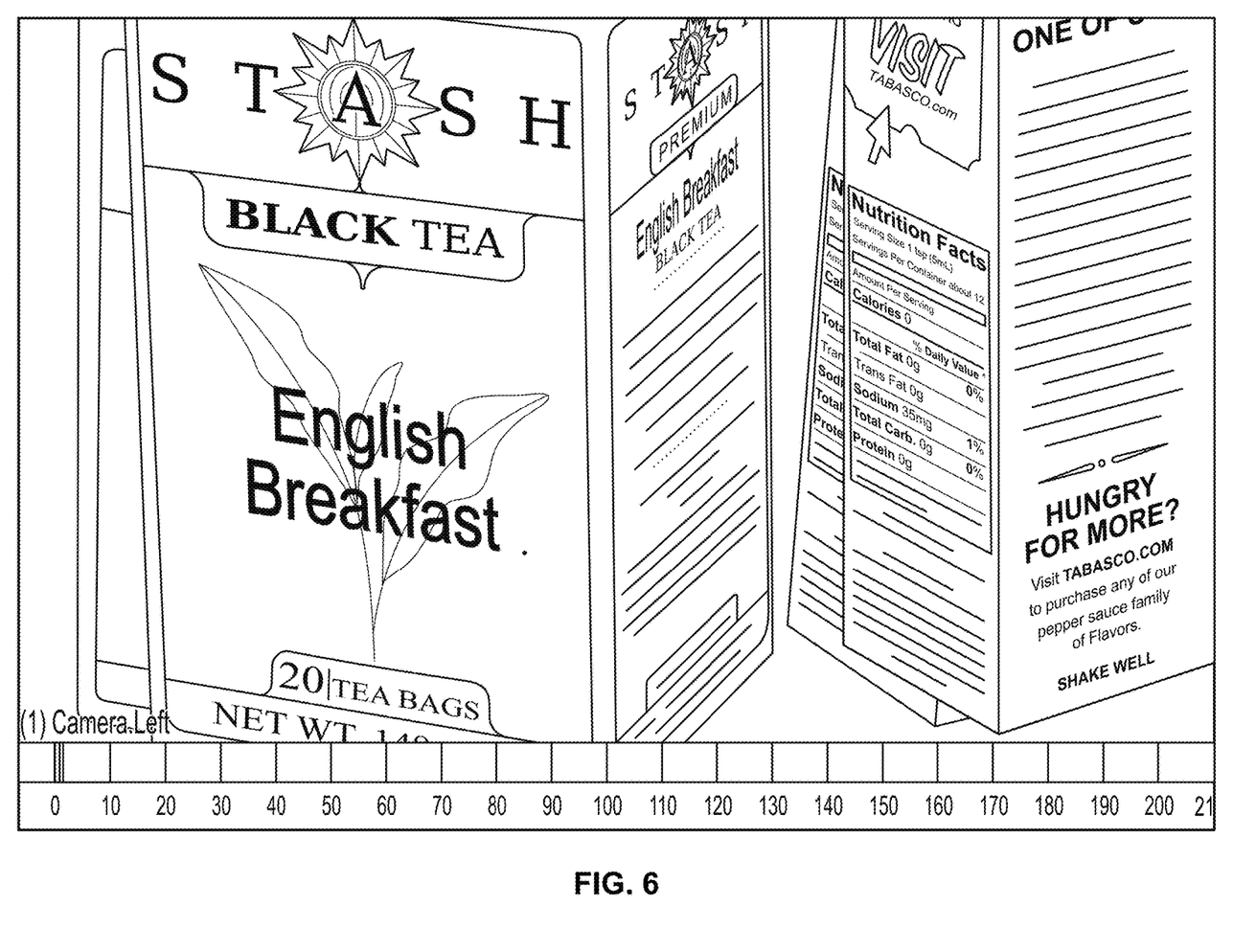
FIG. 6 illustrates an example of overlaying a projection of referenced database objects on the camera view of the source scene.
Figure 7A:
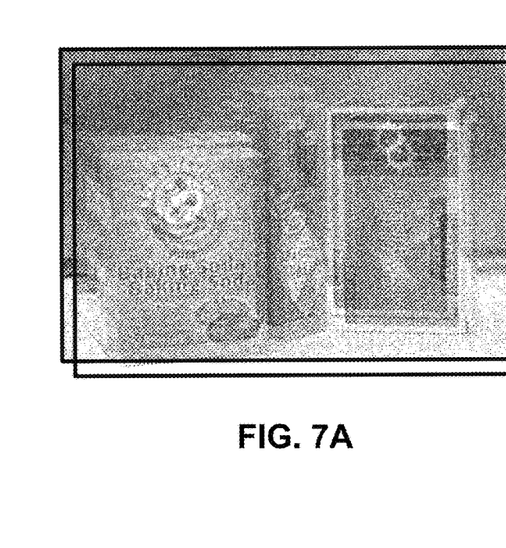
FIGS. 7A-C illustrate examples of overlay methods.
Figure 7B:
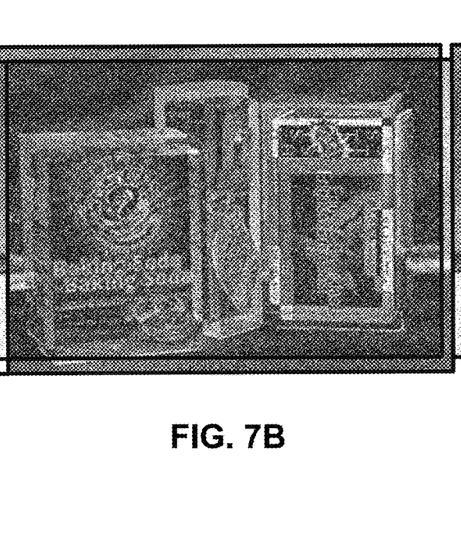
Figure 7C:
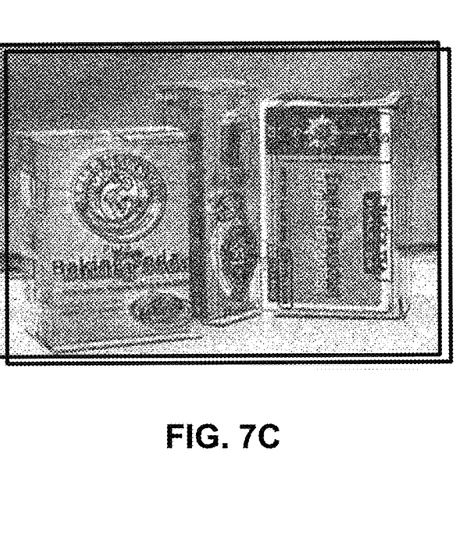

FIG. 6 illustrates an example of overlaying a projection of referenced database objects on the camera view of the source scene. In this example, the objects approximately, but not perfectly, align. FIGS. 7A-C illustrate examples of overlay methods. FIG. 7A illustrates an overlay method in which the camera view is 50% transparent. FIG. 7B illustrates an overlay method comprising the difference between the camera and scene views. FIG. 7C illustrates an overlay method comprising a multiplication between the scene and edges in the camera view. Not shown in the given figures is simply turning the camera view off and on, which may also be an option.

An object specification in the database comprises a variety of information that defines the object, including data related to geometry and appearance. For example, a database object specification may comprise a mesh (which may or may not be parameterized) of vertices of the object and their connectivities as well as normals to the polygons comprising the surfaces defined by the vertices. Furthermore, a database object specification may comprise one or more textures that describe visual details of the object surfaces and/or images of the object surfaces. In various embodiments, such textures may comprise images of the surfaces and/or specifications of parameters that define manners in which the textures may be procedurally generated, i.e., created automatically by a mathematical model rather than by direct application of an image. Moreover, a database object specification may comprise a bump map that describes the roughness of the object surfaces. In various embodiments, such data may be in the form of vector orientations relative to the normal directions of the surfaces of the object and/or may be procedurally generated rather than being tabulated. A database object specification may further comprise a model of the optical behavior of the object at various points on its surfaces and/or information that describes the desired interaction between its surfaces and incident light rays. In various embodiments, such an optical behavior model may range from simple global behavior such as specular reflection (mirror-like response to light), Lambertian diffusion (equally diffuse reflection of light in all directions like paper), a combination of both, or more complex behaviors such as modeling skin or translucent materials where some of the light passes through, bounces around inside, and emerges from another location on the surface and/or object.

Once an object in a scene is initially identified at step 406 and is mapped to a corresponding database object at step 408, features of the object in the source video may be tracked during motion of the object, and the correspondence with the database object as well as camera position/pose may be maintained for reasonable motions, subject to constraints defined by the physics of the scene. For example, the orientation and position of the database object may be estimated through the motion of the tracked points or features of the object in the scene, with the orientation and position being adjusted based on physical constraints such as the object staying connected to a surface it is resting on.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
identifying elements in source content comprising a scene having one or more objects;
mapping identified elements in the source content to corresponding existing database objects including mapping an identified element in the source content that comprises a partial object to a whole or complete existing database object by matching the partial object to the whole or complete existing database object;
virtualizing the source content by representing the source content completely using existing database objects to which identified elements are mapped, wherein in the virtualized version of the source content the partial object in the source content is represented by the whole or complete existing database object to which the partial object is mapped; and
storing a specification of the virtualized version of the source content as a representation of the source content for distribution instead of the original source content;
wherein the virtualized version of the source content comprises a re-imagined version of the source content that does not include original pixel information of the source content, wherein the virtualized version of the source content comprises an automatically augmented version of the source content that includes content that was not present in the original source content but that is included in the virtualized version of the source content to enhance viewing experience, and wherein the specification of the virtualized version of the source content is provided instead of the source content in response to a request for the source content in order to reduce communication bandwidth because providing the specification of the virtualized version of the source content uses less communication bandwidth than providing the source content.

2. The method of claim 1, further comprising determining camera pose with respect to the source content and providing the same camera pose with respect to the virtualized version of the source content.

3. The method of claim 1, wherein a specification of an existing database object comprises a mesh of vertices and their connectivities.

4. The method of claim 1, wherein a specification of an existing database object comprises surface normal vectors.

5. The method of claim 1, wherein mapping comprises selecting an existing database object that best matches an identified element.

6. The method of claim 1, wherein mapping comprises purposely selecting a mismatching existing database object for an identified element.

7. The method of claim 1, wherein a virtual space comprising the virtualized version of the source content comprises a larger space than that encompassed by the source content.

8. The method of claim 1, further comprising tracking and mapping motion of an identified element to motion of the corresponding existing database object in the virtualized version of the source content.

9. The method of claim 1, wherein the source content is two-dimensional and the virtualized version of the source content is three-dimensional.

10. The method of claim 1, wherein a specification of an existing database object comprises a model of optical behavior of that object.

11. A system, comprising:
a processor configured to:
identify elements in source content comprising a scene having one or more objects;
map identified elements in the source content to corresponding existing database objects including mapping an identified element in the source content that comprises a partial object to a whole or complete existing database object by matching the partial object to the whole or complete existing database object;
virtualize the source content by representing the source content completely using existing database objects to which identified elements are mapped, wherein in the virtualized version of the source content the partial object in the source content is represented by the whole or complete existing database object to which the partial object is mapped; and
store a specification of the virtualized version of the source content as a representation of the source content for distribution instead of the original source content;
wherein the virtualized version of the source content comprises a re-imagined version of the source content that does not include original pixel information of the source content, wherein the virtualized version of the source content comprises an automatically augmented version of the source content that includes content that was not present in the original source content but that is included in the virtualized version of the source content to enhance viewing experience, and wherein the specification of the virtualized version of the source content is provided instead of the source content in response to a request for the source content in order to reduce communication bandwidth because providing the specification of the virtualized version of the source content uses less communication bandwidth than providing the source content; and
a memory coupled to the processor and configured to provide the processor with instructions.

12. The system of claim 11, wherein the processor is further configured to determine camera pose with respect to the source content and provide the same camera pose with respect to the virtualized version of the source content.

13. The system of claim 11, wherein a specification of an existing database object comprises a mesh of vertices and their connectivities.

14. The system of claim 11, wherein to map comprises to select an existing database object that best matches an identified element.

15. The system of claim 11, wherein to map comprises to purposely select a mismatching existing database object for an identified element.

16. The system of claim 11, wherein a virtual space comprising the virtualized version of the source content comprises a larger space than that encompassed by the source content.

17. The system of claim 11, wherein the processor is further configured to track and map motion of an identified element to motion of the corresponding existing database object in the virtualized version of the source content.

18. The system of claim 11, wherein the source content is two-dimensional and the virtualized version of the source content is three-dimensional.

19. The system of claim 11, wherein a specification of an existing database object comprises surface normal vectors.

20. A computer program product embodied in a non-transitory computer usable storage medium, comprising computer instructions for:
identifying elements in source content comprising a scene having one or more objects;
mapping identified elements in the source content to corresponding existing database objects including mapping an identified element in the source content that comprises a partial object to a whole or complete existing database object by matching the partial object to the whole or complete existing database object;
virtualizing the source content by representing the source content completely using existing database objects to which identified elements are mapped, wherein in the virtualized version of the source content the partial object in the source content is represented by the whole or complete existing database object to which the partial object is mapped; and
storing a specification of the virtualized version of the source content as a representation of the source content for distribution instead of the original source content;
wherein the virtualized version of the source content comprises a re-imagined version of the source content that does not include original pixel information of the source content, wherein the virtualized version of the source content comprises an automatically augmented version of the source content that includes content that was not present in the original source content but that is included in the virtualized version of the source content to enhance viewing experience, and wherein the specification of the virtualized version of the source content is provided instead of the source content in response to a request for the source content in order to reduce communication bandwidth because providing the specification of the virtualized version of the source content uses less communication bandwidth than providing the source content.

21. The system of claim 11, wherein a specification of an existing database object comprises a model of optical behavior of that object.

22. The computer program product of claim 20, further comprising computer instructions for determining camera pose with respect to the source content and providing the same camera pose with respect to the virtualized version of the source content.

23. The computer program product of claim 20, wherein a specification of an existing database object comprises a mesh of vertices and their connectivities.

24. The computer program product of claim 20, wherein a specification of an existing database object comprises surface normal vectors.

25. The computer program product of claim 20, wherein mapping comprises selecting an existing database object that best matches an identified element.

26. The computer program product of claim 20, wherein mapping comprises purposely selecting a mismatching existing database object for an identified element.

27. The computer program product of claim 20, wherein a virtual space comprising the virtualized version of the source content comprises a larger space than that encompassed by the source content.

28. The computer program product of claim 20, further comprising computer instructions for tracking and mapping motion of an identified element to motion of the corresponding existing database object in the virtualized version of the source content.

29. The computer program product of claim 20, wherein the source content is two-dimensional and the virtualized version of the source content is three-dimensional.

30. The computer program product of claim 20, wherein a specification of an existing database object comprises a model of optical behavior of that object.

* * * * *